M. J. MUESER.
COLANDER.
APPLICATION FILED JUNE 14, 1915.
1,186,598.
Patented June 13, 1916.
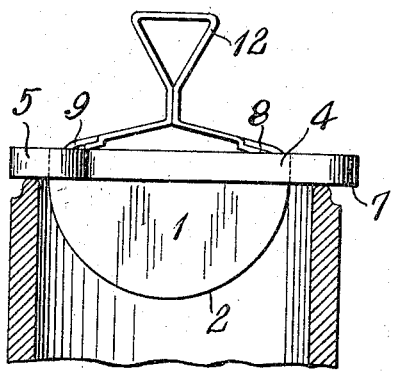
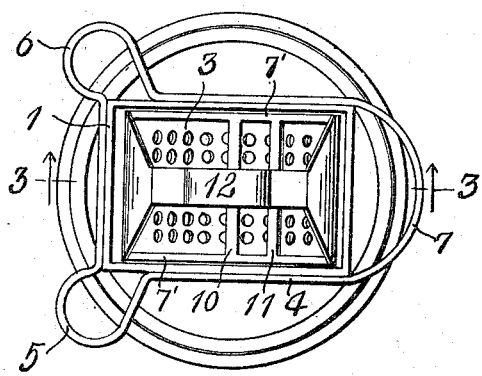
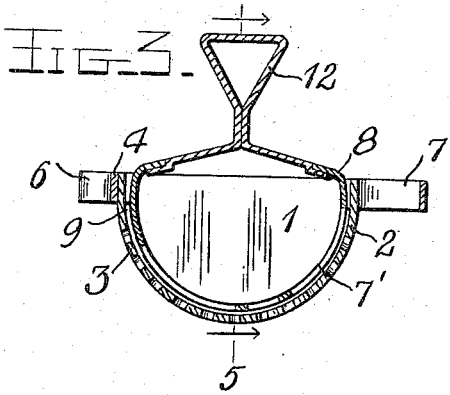
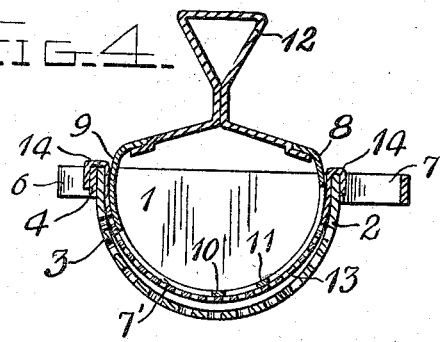
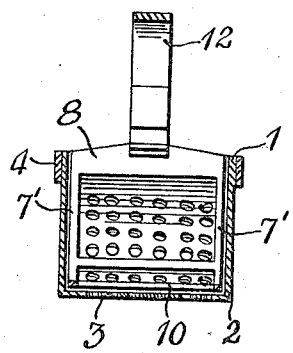
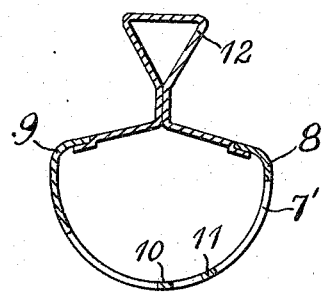
Witnesses
J. Ralph Hoge
Inventor
M. J. Mueser
By H. B. Willson & Co
Attorneys
THE COLUMBIA PLANOGRAPH CO., WASHINGTON, D. C.

UNITED STATES PATENT OFFICE.

MARY J. MUESER, OF PEORIA, ILLINOIS.

COLANDER.

1,186,598.　　　　　Specification of Letters Patent.　　Patented June 13, 1916.

Application filed June 14, 1915. Serial No. 33,986.

*To all whom it may concern:*

Be it known that I, MARY J. MUESER, a citizen of the United States, residing at Peoria, in the county of Peoria and State of Illinois, have invented certain new and useful Improvements in Colanders; and I do declare the following to be a full, clear, and exact description of the invention, such as will enable others skilled in the art to which it appertains to make and use the same.

This invention relates to new and useful improvements in culinary utensils, and more particularly to what are known as colanders, and has for its object to provide an improved structure which is designed to move fruit or other material transversely of a perforated straining member through which it is gradually forced so as to more easily and uniformly distribute the straining.

A further object of the invention is to provide an improved colander device through which fruit or other material may be forced or strained, the same being formed with a perforated portion and a rocking presser member formed so that a gradual pressure is exerted upon the material to force the same through the perforated member and at the same time a substantial stirring action is provided so that the finer portions only are forced through.

A further object of the invention is to provide a device which is durable in construction, inexpensive to manufacture and one which will be very efficient in operation.

With these and numerous other objects in view the invention consists of certain novel features of construction and arrangement of parts which will be hereinafter referred to and more particularly pointed out in the specification and claims.

In the accompanying drawings: Figure 1 is a side elevation of my improved colander applied to a fruit jar, that is shown in section; Fig. 2 is a top plan view of the same; Fig. 3 is a central vertical section taken on the line 3—3 of Fig. 2; Fig. 4 is a similar view, only showing the additional straining strip applied to the device; Fig. 5 is a vertical transverse section taken on the line 5—5 of Fig. 3; and Fig. 6 is a detail section of the presser member.

In describing my invention I shall refer to the drawings in which similar reference characters designate corresponding parts throughout the several views and in which the numeral 1 designates a substantially semi-cylindrical straining member or receptacle having a curved surface 2 of any preferred form of foraminous material 3. Extending around the upper surface of the receptacle 1 is a sheet metal supporting strip 4 attached to opposite sides and one end of the same and having substantially loop-shaped projections at the two corners adjacent the attached end as shown at 5 and 6, and a semi-circular projection at the opposite end as shown at 7 to reinforce the straining member or receptacle and to provide the same with a three-point suspension when placed over a jar or any other receptacle into which the material is to be strained. The semi-circular projection 7 at one end of the receptacle is larger than the loops 5 and 6, and is adapted to act as a handle, and the loops as pivot points when it is desired to lift one end of the receptacle to scrape the lower surface of the same, or for any other purpose.

The presser member, composed of two parallel arch-shaped side bars 7' connected at their two ends as shown at 8 and 9 and also connected at their crown portions by transversely extending cross bars 10 and 11, is provided with a handle 12 connected to the two end portions 8 and 9 to rock it in the said receptacle 1. This presser member is formed of sheet metal and is substantially of a corresponding shape to the receptacle 1 and when arranged therein is adapted to be rocked back and forth over the perforated surface 2 by the same, for a purpose to be hereinafter described.

A perforated strip 13 of equal length and correspondingly shaped to the curved surface of the receptacle 1 is provided with smaller perforations than the perforations in the receptacle 1 and is adapted to be placed over the same and held therein by means of its downturned ends 14 engaging the corresponding ends or edges of the receptacle 1.

In operation, when it is desired to use the device, the fruit or material is placed in the receptacle 1 and the presser member inserted therein and rocked backward and forward, thereby causing the same to gradually exert pressure upon the material to force the same through the perforated member, and at the same time create a substantial stirring action so that the finer portions only are forced therethrough.

This device is especially adaptable in making apple butter whereby the receptacle 1 may be placed over a jar or other receptacle and the apples poured therein while still boiling hot, and the rocking action of the presser bar upon the same will force the butter through into the jar and leave the parings in the receptacle. If it is desired to strain tomatoes, blackberries, or similar small fruits and vegetables, the metallic strip 13 is placed in the receptacle 1 over the inner surface of the curved portion 2, and held therein by its downturned edges 14 engaging the edges of the receptacle 1, and on account of the perforations in the strip 13 being smaller than the perforations of the curved surface 2 in the receptacle, the same may be used for straining the above mentioned fruits and vegetables.

The ends 8 and 9 of the presser member are of different lengths, the end 9 extending a considerable distance between the arch-shaped side bars 7. The object of this extension or enlargement is to provide the presser member with a mashing surface, so that material which ordinarily will not be forced through the strainer by the swift rocking movement of the cross bars, may be mashed through the same by the application of the end 9 of the presser member for that purpose.

From the foregoing description of the construction of my improved colander and the manner of applying the same to use, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

I claim:—

1. A device of the class described comprising a semi-cylindrical receptacle having its curved surface foraminous, a presser member adapted to be disposed therein formed of a rectangular frame having semi-circular side bars, said frame being of an area corresponding to the curved surface of the receptacle, transversely extending integral cross bars connecting the intermediate portions of said frame, the ends of said frame being bent inwardly, and a connecting strip between said ends having its intermediate portion bent to form a handle.

2. A device of the class described comprising a semi-cylindrical receptacle having its curved surface foraminous, a rectangular frame with semi-circular side bars adapted to rock in said receptacle, a strip connecting the ends of said frame to form a handle, transversely extending cross bars on said frame, and one side of said frame being enlarged to provide a mashing surface for the presser bar.

3. A device of the class described comprising a receptacle, a metallic strip surrounding the edge of the same and disposed in a single plane, said strip being secured to portions of the sides of said edge extending from one end to a point adjacent the other, and to said last mentioned end to reinforce the edge of said receptacle, projecting loops formed at either side adjacent said end, and a semi-circular loop formed by said strip at the opposite end, whereby when the device is positioned over a container the same may be supported by said strip, and the semi-circular loop is adapted to act as a handle and the projecting loops as pivot points when it is desired to lift one end of the device.

In testimony whereof I have hereunto set my hand in presence of two subscribing witnesses.

MARY J. MUESER.

Witnesses:
MAY OSWALD,
ALICE ILLINGWORTH.